(12) United States Patent
Kroon

(10) Patent No.: US 12,225,178 B2
(45) Date of Patent: Feb. 11, 2025

(54) CODING SCHEME FOR DEPTH DATA

(71) Applicant: KONINKLIJKE PHILIPS N.V., Eindhoven (NL)

(72) Inventor: Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 233 days.

(21) Appl. No.: 17/641,843

(22) PCT Filed: Sep. 10, 2020

(86) PCT No.: PCT/EP2020/075265
§ 371 (c)(1),
(2) Date: Mar. 10, 2022

(87) PCT Pub. No.: WO2021/052846
PCT Pub. Date: Mar. 25, 2021

(65) Prior Publication Data
US 2022/0394229 A1 Dec. 8, 2022

(30) Foreign Application Priority Data

Sep. 20, 2019 (EP) ..................................... 19198801

(51) Int. Cl.
*H04N 13/00* (2018.01)
*H04N 13/128* (2018.01)
(Continued)

(52) U.S. Cl.
CPC ......... *H04N 13/161* (2018.05); *H04N 13/128* (2018.05); *H04N 13/178* (2018.05); *H04N 19/136* (2014.11); *H04N 19/42* (2014.11); *H04N 19/86* (2014.11); *H04N 2013/0081* (2013.01)

(58) Field of Classification Search
CPC .... H04N 13/161; H04N 19/136; H04N 19/42; H04N 19/86; H04N 13/128; H04N 13/178; H04N 2013/0081
See application file for complete search history.

(56) References Cited

U.S. PATENT DOCUMENTS 9,460,336 B2   10/2016   Han et al.

OTHER PUBLICATIONS

Salahieh et al. "Test Model 2 for Immersive Video". Aug. 2, 2019. (Year: 2019).*

(Continued)

*Primary Examiner* — Zhihan Zhou

(57) ABSTRACT

Methods of encoding and decoding depth data are disclosed. In an encoding method, depth values and occupancy data are both encoded into a depth map. The method adapts how the depth values and occupancy data are converted to map values in the depth map. For example, it may adaptively select a threshold, above or below which all values represent unoccupied pixels. By adapting how the depth and occupancy are encoded, based on analysis of the depth values, the method can enable more effective encoding and transmission of the depth data and occupancy data. The encoding method outputs metadata defining the adaptive encoding. This metadata can be used by a corresponding decoding method, to decode the map values. Also provided are an encoder and a decoder for depth data, and a corresponding bitstream, comprising a depth map and its associated metadata.

20 Claims, 7 Drawing Sheets

(51) Int. Cl.
- *H04N 13/161* (2018.01)
- *H04N 13/178* (2018.01)
- *H04N 19/00* (2014.01)
- *H04N 19/136* (2014.01)
- *H04N 19/42* (2014.01)
- *H04N 19/86* (2014.01)

(56) References Cited

OTHER PUBLICATIONS

International Organization for Standardization Test Model 2 for Immersive Video MPEG Meeting Aug. 8, 2019.
International Organisation for Standardisation Organisation Internationale De Normalisation ISO/IEC JTC1/SC29/WG11 Coding of Moving Pictures and Audio "Depth Coding for Immersive Video" Jul. 2019.
International Organisation for Standardisation Organisation Internationale De Normalisation ISO/IEC JTC1/SC29/WG11 Coding of Moving Pictures and Audio "Imput Contribution" Mar. 2019.
Alvaro Collet et al "High Quality Streamable Free-Viewpoint Video" ACM Trans. Graphics, 34(4) 2015.
Jill Boyce et al "Working Draft 2 of Metadata for Immersive Video" MPEG Meeting Aug. 9, 2019 p. 1-32.
International Search Report and Written Opinion from PCT/EP2020/075265 mailed Sep. 29, 2020.
Joonas Hokkanen et al Appendix 4: The Use of Decision Aid Methods in the Assessment of Risk Reduction Measures in the Control of Chemicals, Jan. 1, 1997.
Depth Map Formats used with MPEG 3D Technologies MPEG Meeting Mar. 1, 2017 p. 4.
Basel Salahieh et al "Depth Maps, View Synthesis, and Anchors for the Kermit Sequence" MPEG Meeting Oct. 5, 2018.
Working Draft 2 of Metadata for Immersive Video, ISO/IEC JTC 1/SC 29/WG 11 Coding of moving pictures and audio Convenorship: UNI (Italy), Aug. 9, 2019.
International Organisation for Standardisation Organisation Internationale De Normalisation, ISO/IEC JTC1/SC29/WG11 Coding of Moving Pictures and Audio, Jan. 2017.
Internet Document: Wen-Neng Lai, Chapter 3: Image Enhancement in the Spatial Domain, 2001, slide 3-2,3-7,3-141.
Ku-Chu Wei, Yung-Lin Huang, and Shao-Yi Chien, Quantization Error Reduction in Depth Maps, 2013 IEEE International Conference onAcoustics, Speech and Signal Processing May 26-31, 2013, https://ieeexplore.ieee.org/document/6637910, section 3.

* cited by examiner

CODING SCHEME FOR DEPTH DATA

CROSS-REFERENCE TO PRIOR APPLICATIONS

This application is the U.S. National Phase application under 35 U.S.C. § 371 of International Application No. PCT/EP2020/075265, filed on Sep. 10, 2020, which claims the benefit of EP Patent Application No. EP 19198801.3, filed on Sep. 20, 2019. These applications are hereby incorporated by reference herein.

FIELD OF THE INVENTION

The present invention relates to coding of depth data. It relates particularly to methods and apparatuses for encoding and decoding immersive video.

BACKGROUND OF THE INVENTION

Immersive video, also known as six-degree-of-freedom (6DoF) video, is video of a three-dimensional (3D) scene that allows views of the scene to be reconstructed for viewpoints that vary in position and orientation. It represents a development of three-degree-of-freedom (3DoF) video, which allows views to be reconstructed for viewpoints with arbitrary orientation, but only at a fixed point in space. In 3DoF, the degrees of freedom are angular—namely, pitch, roll, and yaw. 3DoF video supports head rotations—in other words, a user consuming the video content can look in any direction in the scene, but cannot move to a different place in the scene. 6DoF video supports head rotations and additionally supports selection of the position in the scene from which the scene is viewed.

To generate 6DoF video requires multiple cameras to record the scene. Each camera generates image data (often referred to as texture data, in this context) and corresponding depth data. For each pixel, the depth data represents the depth at which the corresponding image pixel data is observed. Each of the multiple cameras provides a respective view of the scene.

To reduce redundancy between the views, it has been proposed to prune the views and pack them into a "texture atlas", for each frame of the video stream. This approach attempts to reduce or eliminate overlapping parts among the multiple views, and thereby improve efficiency. The non-overlapping portions of the different views, which remain after pruning, may be referred to as "patches". An example of this approach is described in Alvaro Collet et al., "High-quality streamable free-viewpoint video", ACM Trans. Graphics (SIGGRAPH), 34(4), 2015.

SUMMARY OF THE INVENTION

It would be desirable to encode depth data efficiently. Related to depth data is occupancy data, which indicates whether a given pixel in a given view is occupied by a patch or not. Valid depth data exists for patches. For non-occupied pixels, there is no valid depth data. One approach would be to encode the occupancy map separately from the depth data but this would require transmission of an additional data structure. Another approach would be to encode the occupancy information embedded in the depth data—for example, by reserving a particular depth value to signal that a pixel is unoccupied. However, the depth data may be compressed for transmission. Both the compression and the subsequent transmission may introduce errors in the decoded depth data. If the occupancy data is embedded with the depth data, compression or transmission errors might also corrupt the occupancy data, which could ultimately lead to noticeable or disturbing visual artifacts in the decoded and rendered immersive video. It would be desirable to reduce or avoid such artifacts while encoding the depth and occupancy data efficiently.

The invention is defined by the claims.

According to examples in accordance with an aspect of the invention, there is provided a method of encoding depth data, the method comprising:

receiving source data comprising at least depth values;

defining a depth map comprising an array of map values, each map value taking one of a plurality of levels;

analyzing the depth values, to determine how to encode the depth values into the plurality of levels;

defining, based on a result of the analyzing, a first subset of the plurality of levels for representing depth data of an occupied part of the depth map;

defining, based on the result of the analyzing, a second subset of the plurality of levels for representing an unoccupied part of the depth map;

for the unoccupied part of the depth map, assigning one or more map values from the defined second subset of the plurality of levels;

for the occupied part of the depth map, converting the depth values to map values in the defined first subset of the plurality of levels, thereby encoding the depth values in the depth map; and generating a bitstream comprising the depth map and metadata comprising a definition of the first subset and the second subset.

This method allows the occupancy to be encoded in the depth map. The inventor has recognized that coding the occupancy and depth together works better if the coding can adapt to the content of the depth map. If the first and second subsets are fixed, then the encoding may be sub-optimal. By analyzing the depth values, and choosing the first and second subsets according to the results of the analysis, the present method can make more effective use of the bits available for the depth map.

The source data may be source video data. The source data may further comprise occupancy data indicating occupied and/or unoccupied parts of the depth map.

The definition of the first subset and the second subset depends on the content of the depth data. That is, the selection of the subsets adapts to the content of the source data.

The method may further comprise compressing the depth map using a video compression algorithm, optionally a standardized video compression algorithm such as High Efficiency Video Coding (HEVC), also known as H.265 and MPEG-H Part 2. The bitstream may comprise the compressed depth map.

Defining the subsets may comprise choosing at least one threshold level.

Defining the first and second subsets may comprise choosing a first threshold level among the plurality of levels, wherein one of the subsets comprises all levels greater than the first threshold level.

Optionally, the other subset comprises all levels less than the first threshold level. The metadata may include a definition of the first threshold level. This may be explicit (that is, the metadata may include the first threshold level) or implicit (for example, the metadata may define a conversion function that implicitly involves a first threshold).

The first threshold level may be chosen to be a power of two.

That is, the first threshold level is chosen to be $2^n$, where n is a non-negative integer. When the map values are encoded as binary numbers, this may allow the occupancy to be determined by examining a subset of the bits of the binary map value.

The method may further comprise defining a third subset of the plurality of levels as guard levels, not to be used in the depth map, wherein the metadata further comprises a definition of the third subset.

The third subset is distinct from the first subset and the second subset. That is, the levels of the third subset are not in the first subset and not in the second subset.

Introducing guard levels may further enhance robustness against errors introduced by compression or transmission. The guard levels may comprise a range of levels between the first subset and the second subset. The guard levels are not used to represent depth data and are not used to represent an unoccupied part of the depth map. At the decoder, any instance of a map value equal to one of the guard levels may be detected as an error and optionally corrected.

The third subset may be defined by a second threshold level. For example, the third subset may be defined as comprising levels between the first threshold and the second threshold. The metadata may include a definition of the second threshold level. This definition may be direct/explicit (for example, the metadata may include the second threshold level) or indirect/implicit.

Analyzing the depth data may comprise determining a dynamic range of the depth data.

The method may further comprise measuring or predicting the extent of errors in the decoded depth data that will be caused by encoding the depth values in the depth map in a given way.

The depth data may comprise normalized disparity values. Normalized disparity values occupy the range [0,1], where 0 represents infinite depth and 1 represents minimum depth. The use of normalized disparity values can facilitate a better allocation of bits to the depth values. For example, assume that depth is measured in meters. The difference between 1 m and 2 m is more visually significant than the difference between 10 m and 11 m (even though the absolute depth-difference of 1 m is the same in both cases). Normalized disparity helps to capture this relative significance: in the first case, the difference in normalized disparity is $(1/1-1/2)=0.5$, whereas in the second case, the difference in normalized disparity is $(1/10-1/11)=0.009$.

Converting the depth values to map values may comprise converting using a piecewise linear function, and the metadata may further comprise a definition of the piecewise linear function.

The source data may be video data comprising a plurality of source views, each source view comprising texture values and depth values. In other words, a method of encoding depth data as summarized above can be applied in a method of encoding immersive video.

Also provided is a method of decoding depth data, the method comprising:
  receiving a bitstream comprising a depth map and associated metadata,
    the depth map comprising an array of map values,
    each map value taking one of a plurality of levels,
    the metadata defining a first subset of the plurality of levels, which represents depth data of an occupied part of the depth map, and the metadata defining a second subset of the plurality of levels, which represents an unoccupied part of the depth map;
  decoding the depth map, comprising converting map values in the first subset of values to depth values; and
  outputting the depth values.

Decoding the depth map optionally further comprises generating an occupancy map by identifying map values that are in the second subset of values.

The depth map in the bitstream may have been compressed using a video compression algorithm, optionally a standardized video compression algorithm. The method may comprise, before decoding the depth map, decompressing the depth map according to the video compression algorithm.

At least one of the first and second subsets may be defined by a first threshold level among the plurality of levels, wherein one of the subsets comprises all levels greater than the first threshold level. The other subset may comprise all levels less than the first threshold level.

The metadata may further comprise a definition of a piecewise linear function, and converting the map values to depth values may comprise converting using the piecewise linear function.

The metadata may further comprise a definition of a third subset of the plurality of levels, being guard levels that were not used in the depth map, the method further comprising, before decoding the depth map, detecting any map values in the third subset of values.

In the received depth map, any values in the third subset are errors. They may have been introduced by compression or transmission errors. The method may comprise skipping or correcting these values, when decoding the depth map. In some embodiments, map values that are close to a value in the first subset (that is, close to a valid value) may be corrected by changing them to the nearest valid value.

The depth values may be depth data of video data comprising a plurality of source views, and the method may further comprise reconstructing at least one of the plurality of source views.

The metadata may comprise a negative normalized disparity value and a positive normalized disparity value. This can offer one way to implicitly define the first subset and the second subset—in particular, when using a linear (or piecewise linear) conversion function between depth values and map values. The negative normalized disparity value may define an x-axis intercept of the conversion function (or piece of the conversion function). This negative normalized disparity value may be assigned to level 0 in the map values. The positive normalized disparity value may define the maximum normalized disparity (minimum depth) that is to be encoded (or the maximum normalized disparity that is to be encoded with this piece of the conversion function). This positive normalized disparity value is assigned to a specified level (for example, the maximum level, in the case of a single linear conversion function). This implicitly defines a first subset of levels (those corresponding to positive depth values) for representing depth data, and implicitly defines a second subset of levels (those corresponding to "negative" depth values) for representing unoccupied parts of the depth map. Since real normalized disparity values cannot be negative, all of the depth values will be converted to levels in the first subset.

Also disclosed is a computer program comprising computer code for causing a processing system to implement a method as summarized above when said program is run on the processing system. The computer program may be stored on a computer-readable storage medium. This may be a non-transitory storage medium.

Also provided is an encoder for depth data, configured to encode depth values into a depth map comprising an array of map values, each map value taking one of a plurality of levels, the encoder comprising:
an input, configured to receive source data comprising at least depth values;
an analyzer, configured to:
analyze the depth values, to determine how to encode the depth values into the plurality of levels,
define, based on a result of the analysis, a first subset of the plurality of levels for representing depth data of an occupied part of the depth map;
define, based on the result of the analysis, a second subset of the plurality of levels for representing an unoccupied part of the depth map; and
a depth value encoder, configured to:
for the unoccupied part of the depth map, assign one or more map values from the defined second subset of the plurality of levels;
for the occupied part of the depth map, convert the depth values to map values in the defined first subset of the plurality of levels, thereby encoding the depth values in the depth map; and
generate a bitstream comprising the depth map and metadata comprising a definition of the first subset and the second subset.

Further provided is a decoder for depth data, the decoder comprising:
an input, configured to receive a bitstream comprising a depth map and associated metadata,
the depth map comprising an array of map values, each map value taking one of a plurality of levels,
the metadata defining a first subset of the plurality of levels, which represents depth data of an occupied part of the depth map, and the metadata defining a second subset of the plurality of levels, which represents an unoccupied part of the depth map;
a depth value decoder, configured to decode the depth map, comprising converting map values in the first subset of values to depth values; and
an output, configured to output the converted depth values.

According to still another aspect, there is provided a bitstream comprising a depth map and associated metadata, the depth map comprising an array of map values, each map value taking one of a plurality of levels,
the metadata defining a first subset of the plurality of levels, which represents depth data of an occupied part of the depth map, and the metadata defining a second subset of the plurality of levels, which represents an unoccupied part of the depth map.

The bitstream may be encoded and decoded using methods as summarized above. It may be embodied on a computer-readable medium or as a signal modulated onto an electromagnetic carrier wave.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
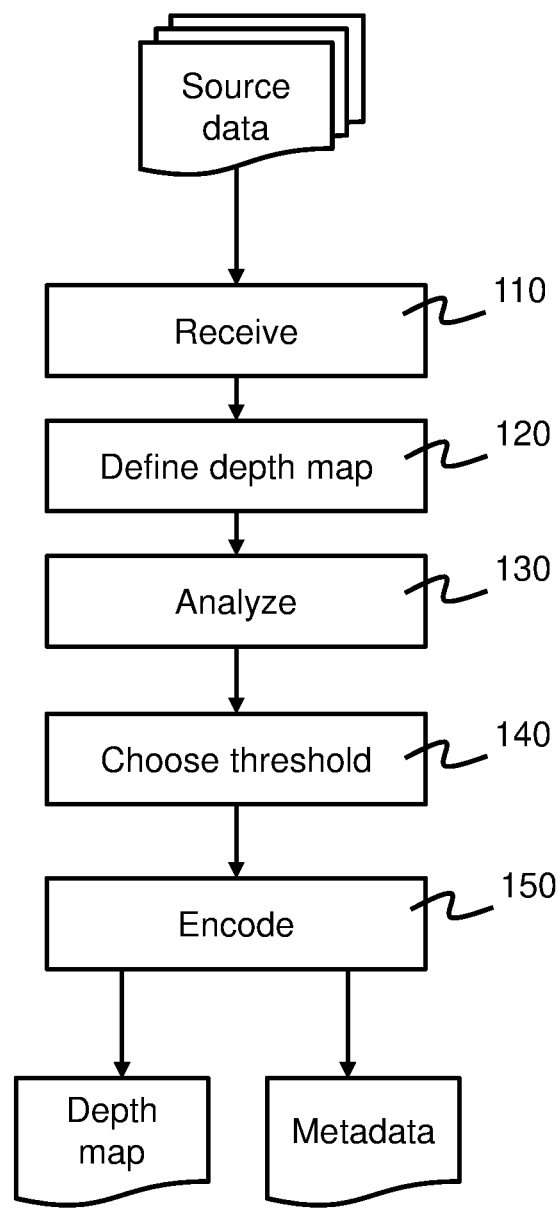
FIG. 1 is a flowchart of a method of encoding depth data according to a first embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Methods of encoding and decoding depth data are disclosed. In an encoding method, depth values and occupancy data are both encoded into a depth map. The method adapts how the depth values and occupancy data are converted to map values in the depth map. For example, it may adaptively select a threshold, above or below which all values represent unoccupied pixels. By adapting how the depth and occupancy are encoded, based on analysis of the depth values, the method can enable more effective encoding and transmission of the depth data and occupancy data. The encoding method outputs metadata defining the adaptive encoding. This metadata can be used by a corresponding decoding method, to decode the map values. Also provided are an encoder and a decoder for depth data, and a corresponding bitstream, comprising a depth map and its associated metadata.

It would be desirable to compress depth data using known image and video compression algorithms. It would be particularly desirable to be able to compress the depth data using standardized algorithms. Suitable hardware and software for encoding and decoding according to standardized codecs is widely available, and often highly optimized in terms of both speed, quality and power consumption. However, most video compression is lossy, in order to achieve bit rates that are practical for transmission and storage. Therefore, it cannot generally be guaranteed that a depth map compressed using video compression techniques will be reconstructed perfectly at the decoder. Errors will be introduced both by the compression and potentially also by the transmission and/or storage of the bitstream.

One basic approach to combine encoding of depth values and occupancy data in a depth map (not according to the invention) would be to set a fixed threshold to distinguish between unoccupied pixels and valid depth values. For example, it may be desired to encode depth data using HEVC Main 10 Level 5.2, meaning that the maximum bit depth is 10. This implies that 1024 levels (from 0 to 1023) are available to encode the depth and occupancy data. The coding scheme for depth data may define that all levels from 0 to 63 indicate an unoccupied pixel. Only levels 64 to 1023 are used to encode depth values. This implies that over 6% of the available range is given over to encode the occupancy. This may be appropriate for some content but inefficient for other content. It is difficult to choose a single fixed threshold that will be suitable generally for all types of content.

Figure 2:
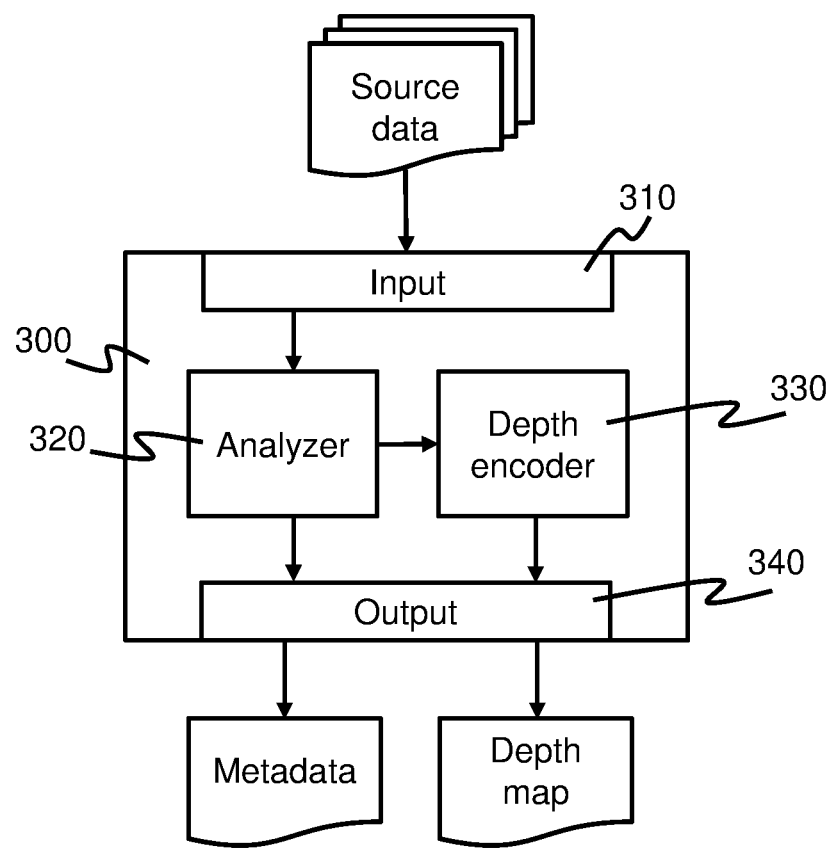
FIG. 2 is a block diagram of an encoder for depth data according to an embodiment, which is configured to carry out the method illustrated in FIG. 1.

FIG. 1 illustrates an encoding method according to the first embodiment of the present invention. FIG. 2 is a schematic block diagram of an encoder for carrying out the method of FIG. 1.

The encoder 300 comprises an input 310; an analyzer 320; a depth value encoder 330; and an output 340. In step 110, the input 310 receives source data comprising depth values. In the present embodiment, the source data is immersive video data comprising a plurality of source views. Each source view comprises texture values and depth values. Encoding of the texture values is outside the scope of the present invention and will not be discussed further here.

In step 120, the depth value encoder 330 defines a depth map comprising an array of map values. Each map value takes one of a plurality of levels. For example, if the maximum bit depth is 10, there would be 1024 levels.

The input 310 is coupled to the analyzer 320. In step 130, the analyzer analyzes the depth values to determine how best to encode the depth values into the plurality of levels. In the present embodiment, map values below a threshold will be used to represent unoccupied pixels and map values above the threshold will be used to encode depth values. Therefore, the task of the analyzer is to choose the threshold (step 140) based on the analysis of the depth values. Further details of how to choose the threshold will be discussed later below. For now, it is noted that the threshold (T) may be chosen to be a power of two ($T=2^n$). This may be advantageous since it can allow a simple check, at the decoder, to establish whether a given map value is above or below the threshold. Rather than comparing the map value with a specific threshold value, the decoder can simply check the most significant bits (MSBs) of the map value. For example, if the threshold $T=256=2^8$, then the decoder can check the two most significant bits of the 10-bit representation. If both of these bits are 0, the value is below the threshold; otherwise, if either of the bits is 1, the value is above the threshold.

In step 150, the depth value encoder 330 populates the depth map. For pixels that are unoccupied, the depth map is populated with one or more map values below the selected threshold. For each pixel that is occupied, the depth value encoder 330 converts the depth value to a respective map value lying above the threshold.

The depth value encoder 330 provides the populated depth map, containing the encoded map values, to the output 340. Meanwhile, the analyzer 320 provides metadata to the output 340. The metadata includes information defining how the depth values are encoded. In particular, the metadata includes information about the threshold chosen. The metadata may also include information about the mapping of depth values to map values in the range above the threshold. However, this may not be necessary in some embodiments as of the mapping may be defined explicitly in the coding scheme. For example, all depth values may be normalized disparity values in the range [0,1], and the mapping may be a linear mapping to map values above the threshold.

The output 340 generates and outputs a bitstream comprising at least the depth map. It also outputs the metadata, either as part of the same bitstream or separately from the bitstream.

Figure 3:
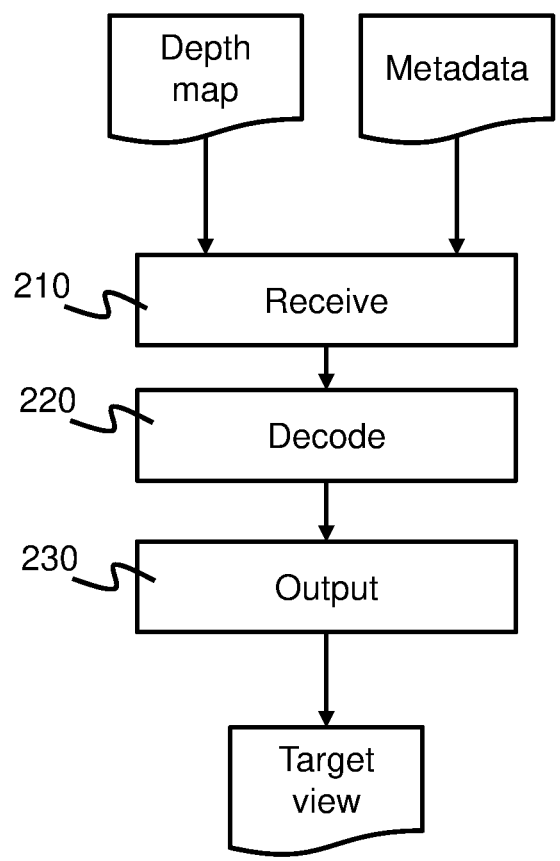
FIG. 3 is a flowchart illustrating a method of decoding depth data according to a second embodiment of the invention.
Figure 4:
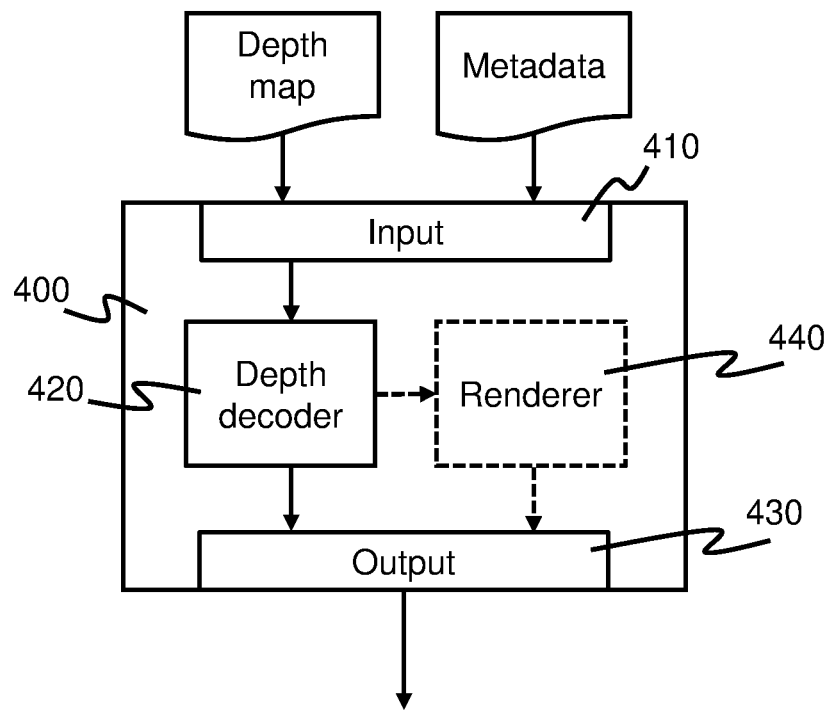
FIG. 4 is a block diagram of a decoder for depth data according to an embodiment, which is configured to carry out the method illustrated in FIG. 3.

FIG. 3 is a flowchart illustrating a method of decoding an encoded depth map according to a second embodiment of the invention. FIG. 4 is a schematic block diagram of a decoder for carrying out the method of FIG. 3.

The decoder 400 comprises an input 410; a depth value decoder 420; and an output 430. Optionally, it may also comprise a renderer 440.

In step 210, the input 410 receives a bitstream comprising a depth map. The input also receives metadata describing the bitstream. The metadata may be embedded in the bitstream or may be separate. The depth map in this example is one created according to the method of FIG. 1 described above. Note that the depth map input to the decoder 400 will typically be a version of the depth map output by the encoder 300 that has subsequently been subjected to lossy video compression (and possibly error-prone communication through a transmission channel).

In step 220, the depth value decoder 420 decodes the depth map. This involves identifying map values above the threshold and converting them back to depth values. As discussed above, the threshold is included in the metadata. The proper conversion function may be agreed between the encoder and decoder in advance (for example, defined as part of a standardized coding scheme). Alternatively, if not defined/agreed in advance, the conversion function may be embedded in the metadata and the decoder may extract it from the metadata.

The depth value decoder 420 provides the decoded depth values to the output 430. The output 430 outputs the depth values (step 230). The depth value decoder may also output an occupancy map, indicating the pixels of the depth map where the map value was below the threshold.

If the decoder 400 includes the optional renderer 440, the depth value decoder 420 may provide the decoded depth values to the renderer, which reconstructs one or more views from the depth data. In this case, the renderer 430 may provide the reconstructed view to the output 430, and the output 430 may output this reconstructed view (for example, to a frame buffer).

There are various ways in which the map values can be dynamically assigned to encode the depth (and respectively occupancy) data. Some of these ways will now be discussed in more detail—along with the corresponding analysis to be performed by the analyzer 320.

In some embodiments, analyzing the depth values comprises determining a dynamic range of the depth values. If the dynamic range is small (that is, if the depth values are all around the same value and the differences between them are not significant, then a small number of bits can be used to encode occupancy. For example, if all cameras are sufficiently close to an object, and the dynamic range of the depth map is not critical then one bit may be used to encode the occupancy map. That is, for a 10-bit depth map, the threshold level would be $T=512=2^9$. This still leaves 512 levels for encoding the depth data, which may be sufficient in close-up scenarios.

When a patch, view, frame or video is determined to have full occupancy, then the threshold may be set to 0 indicating that all pixels are occupied. This maximizes the number of levels available to encode the depth data.

In some embodiments, the method may comprise measuring or predicting the extent of visible errors in the decoded depth data that would be caused by encoding the depth values in a particular way. For example, the analyzer 320 may study the camera parameters associated with the source views in order to determine how to encode the depth values. If two cameras have a wide angular spacing (for instance, 90°), then depth errors in one view will be readily apparent as a shift to the left or right in the other view. In these circumstances, it would be advantageous to encode the depth values as accurately as possible. On the other hand, if two cameras have a small angular spacing (for instance, 5°), then errors in the depth values are much less likely to be perceptible.

In some embodiments, the analysis may comprise encoding the depth values, compressing the depth values, decompressing and decoding the depth values, and synthesizing a test view from the decoded depth values. The synthesized test view can be compared with a reference view derived from the original source data, to produce an error/difference image. This may be repeated for different configurations of the first subset and the second subset of levels. The configuration leading to the smallest error/difference may be chosen for encoding the depth values.

Depth values may be stored as normalized disparities (1/Z) with a near and far depth corresponding to the highest and lowest depth level, respectively. One model assumes that the chosen threshold level corresponds to the far depth and 1023 to the near depth (for 10-bit data).

When specifying the depth range, there are various ways to specify the occupancy coding.

Figure 5:
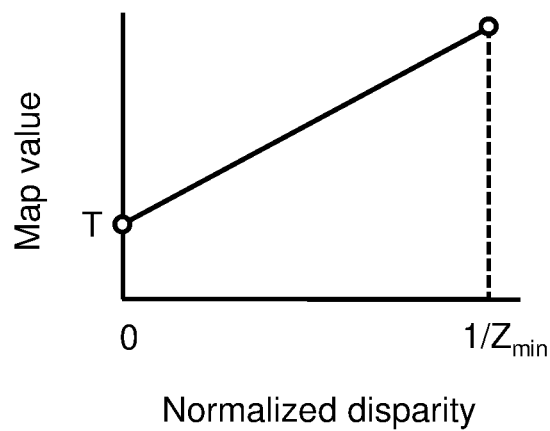
FIG. 5 shows an exemplary linear conversion function for converting between depth values and map values.

FIG. 5 illustrates an example of depth values encoded into map values by a linear function. For a given depth value on the x-axis the function defines a corresponding map value on the y-axis. It is assumed that the depth values are provided as normalized disparities; hence, the depth value ranges from a minimum value of $1/Z_{max}$ to a maximum value of $1/Z_{min}$. In the example of FIG. 5, the maximum depth is assumed to be at infinity (Z=∞); therefore, the minimum value of the normalized disparity is 0. The y-axis intercept of the line gives the threshold level. T. Map values below T will be used to represent unoccupied pixels. The maximum depth value ($1/Z_{min}$) will be converted to the maximum map value (1023, in the case of 10-bit encoding). The map values for depth values between 0 and $1/Z_{min}$ can be obtained by linear interpolation. The conversion function may be defined in the metadata in various ways. For example, the metadata may include the threshold T and the minimum depth value $Z_{min}$. The maximum and minimum map values may be known implicitly from the bit-depth (1023 and 0, respectively, for 10-bits, for example); therefore, it may be unnecessary to encode these explicitly in the metadata.

Figure 6:
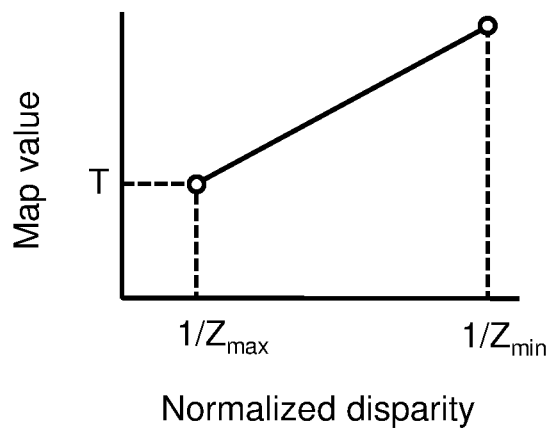
FIG. 6 shows another exemplary linear conversion function.

FIG. 6 shows another exemplary linear conversion function. Here, the maximum depth, $Z_{max}$, is less than infinity; therefore, there is a nonzero $1/Z_{max}$. The linear conversion function runs from the coordinates ($1/Z_{max}$, T) to the coordinates ($1/Z_{min}$, 1023). Again, map values below T are used to represent unoccupied areas. This conversion function can be defined in the metadata by three parameters: the threshold T; the minimum depth value $Z_{min}$; and the maximum depth value $Z_{max}$.

Figure 7:
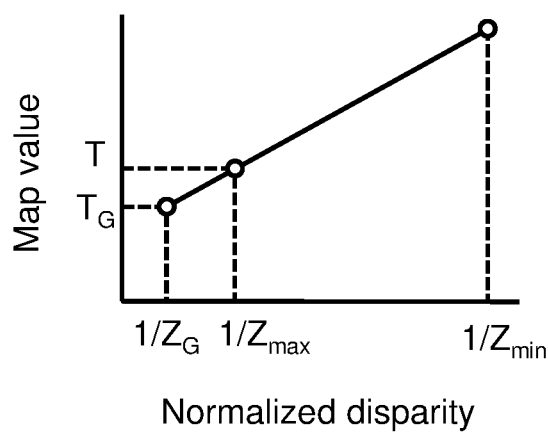
FIG. 7 shows a linear conversion function with guard levels.

A potential problem can arise if compression or transmission errors are introduced in normalized disparity values that are very close to $1/Z_{max}$. The map value may cross the threshold T as a result of an error, meaning that a pixel at a far depths incorrectly replaced with an unoccupied pixel. FIG. 7 shows a conversion function that seeks to prevent this by introducing guard levels between the levels that are used to encode the depth data and the levels that are used to indicate unoccupied pixels. The lowest map value used to encode depth values is given by a first threshold, T. But only map values below a second threshold, $T_G$, are used to represent unoccupied pixels. This can equally be seen as introducing a guard band in the depth values, between $1/Z_{max}$ and $1/Z_G$. It may be described in the metadata in either way. In other words, one additional threshold is defined in the metadata, which may be a threshold in map value or a threshold in depth value.

Figure 8:
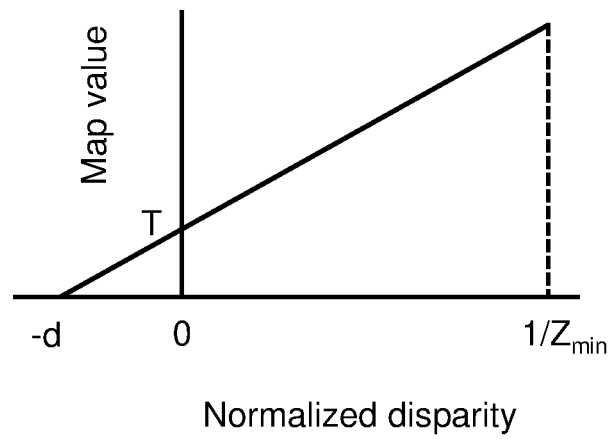
FIG. 8 illustrates an alternative way to define a linear conversion function.

FIG. 8 illustrates another way to define a linear conversion function. Here, the metadata comprises a positive depth value $1/Z_{min}$, and a negative depth value, $-d$. The negative depth value has no real, physical meaning (since normalized disparities are always non-negative). It serves as an implicit definition of the threshold T (at the y-axis intercept) below which map values are used to indicate unoccupied pixels. The example of FIG. 8 has no guard levels, but these could be introduced by specifying an additional threshold, similarly to the approach taken in FIG. 7.

Figure 9:
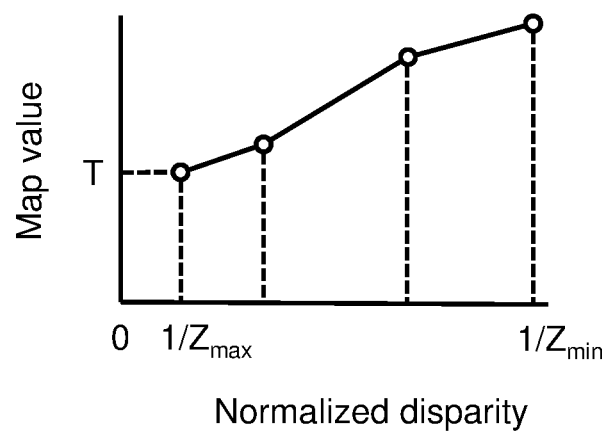
FIG. 9 shows a piecewise linear conversion function.

FIG. 9 shows a piecewise linear conversion function. The piecewise linear function has three segments, which may be defined in the metadata by the coordinates of their endpoints. The map value defining the y-axis coordinate of the first endpoint implicitly defines the threshold T. In other words, the (x, y) coordinates of the first endpoint are ($1/Z_{max}$, T). The first linear segment has a relatively shallow slope, meaning that relatively few map values are being assigned to depth values in this range. The middle linear segment has a steeper slope, indicating that relatively more map values are being assigned to depth values in this range. The third linear segment again has a shallower slope, with fewer levels assigned to its map values. Such a profile may be appropriate, for example, when most of the depth values are clustered in the middle distance. In this case, errors in pixels that are very near to the camera or very far away may be less disruptive—that is, more acceptable to the viewer.

Figure 10:
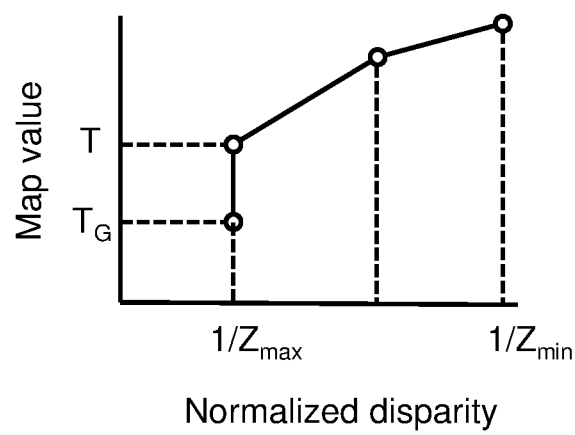
FIG. 10 shows a piecewise linear conversion function with guard levels.

FIG. 10 shows another piecewise linear conversion function, with guard levels. The guard levels may be understood (and potentially encoded in the metadata) as a vertical step in the piecewise linear function. The guard levels are the map values in the range of the step, from $T_G$ to T. The unoccupied pixels are indicated only by map values less than $T_G$.

The examples in FIGS. 5-10 are not mutually exclusive and conversion functions may be provided that combine attributes of several of these examples. For instance, one or more pieces of a piecewise linear function (like the one in FIG. 9) may be defined by a notional negative depth value, as in FIG. 8. A third subset of levels, consisting of guard levels, may be introduced in any of the examples.

In each of the examples above, the second subset of levels (indicating unoccupied pixels) are separated from the first subset of levels (indicating valid depth values) by one or two thresholds, with the first subset of levels being higher than the second subset of levels. It will be understood that this is not essential. In other embodiments, the levels may be allocated in different ways. For example, the analysis in step 130 may reveal that the depth data consists of a cluster of depth values close to the camera, and a cluster of depth values very far from the camera, with no pixels having depth values in the middle distance. In this case, it may make sense to allocate a set of levels in the middle of the range of map values for denoting unoccupied pixels. Such a range could be defined by a start threshold and an end threshold. In the case of encoding using a piecewise linear function, these thresholds may be implicit in the coordinates of the endpoints of the linear segments.

Although examples described above have used piecewise linear functions, it is of course possible that other functions could be used to convert between depth values and map values. Such functions could include (but are not limited to): quadratic functions, higher order polynomial functions, exponential functions, and logarithmic functions. The functions may be used in their entirety, or piecewise, combined with other piecewise functions.

Embodiments of the present invention rely on the use of metadata describing the encoding process when decoding the map values. Since the metadata is important to the decoding process, it may be beneficial if the metadata is encoded with additional error detecting or error correcting codes. Suitable codes are known in the art of communications theory.

The encoding and decoding methods of FIGS. 1 and 3, and the encoder and decoder of FIGS. 2 and 4, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs) or graphics processing units (GPUs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Storage media may include volatile and non-volatile computer memory such as RAM, PROM, EPROM, and EEPROM. Various storage media may be fixed within a computing device or may be transportable, such that the one or more programs stored thereon can be loaded into a processor.

Metadata according to an embodiment may be stored on a storage medium. A bitstream according to an embodiment may be stored on the same storage medium or a different storage medium. The metadata may be embedded in the bitstream but this is not essential. Likewise, metadata and/or bitstreams (with the metadata in the bitstream or separate from it) may be transmitted as a signal modulated onto an electromagnetic carrier wave. The signal may be defined according to a standard for digital communications. The carrier wave may be an optical carrier, a radio-frequency wave, a millimeter wave, or a near field communications wave. It may be wired or wireless.

To the extent that an embodiment is implemented partly or wholly in hardware, the blocks shown in the block diagrams of FIGS. 2 and 4 may be separate physical components, or logical subdivisions of single physical components, or may be all implemented in an integrated manner in one physical component. The functions of one block shown in the drawings may be divided between multiple components in an implementation, or the functions of multiple blocks shown in the drawings may be combined in single components in an implementation. Hardware components suitable for use in embodiments of the present invention include, but are not limited to, conventional microprocessors, application specific integrated circuits (ASICs), and field-programmable gate arrays (FPGAs). One or more blocks may be implemented as a combination of dedicated hardware to perform some functions and one or more programmed microprocessors and associated circuitry to perform other functions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A method of encoding depth data, the method comprising:
   receiving source data,
      wherein the source data comprises depth values;
   defining a depth map,
      wherein the depth map comprises an array of map values,
      wherein each map value is one of a plurality of levels;
   analyzing the depth values,
      wherein the analyzing is arranged to determine encoding of the depth values into the map values;
      wherein a range of the map values is not equal to a range of the depth values,
   defining a first subset of the plurality of levels for of an occupied part of the depth map, based on a result of the analyzing;
   defining a second subset of the plurality of levels of an unoccupied part of the depth map, based on a result of the analyzing;
   assigning one or more map values to the second subset;
   converting the depth values to map values in the first subset; and
   generating a bitstream,
      wherein the bitstream comprises the depth map and metadata,
      wherein the metadata comprises a definition of the first subset and the second subset.

2. The method of claim 1,
   wherein defining the first subset and the second subset comprises choosing a threshold level from the plurality of levels,
   wherein one of the subsets comprises all levels greater than the threshold level.

3. The method of claim 1, further comprising defining a third subset of the plurality of levels as guard levels, wherein the metadata comprises a definition of the third subset.

4. The method of claim 1, wherein the analyzing comprises determining the range of the depth values.

5. The method of claim 1,
wherein converting the depth values to map values comprises using a piecewise linear function,
wherein the metadata comprises a definition of the piecewise linear function.

6. A non-transitory computer-readable medium comprising a computer program that, when executed on at least one processor, performs the method as claimed in claim 1.

7. A method of decoding depth data comprising:
receiving a bitstream, wherein the bitstream comprises a depth map and metadata,
wherein the depth map comprises an array of map values,
wherein each map value is one of a plurality of levels,
wherein the metadata defines a first subset of the plurality of levels and a second subset of the plurality of levels,
wherein the first subset represents an occupied part of the depth map,
wherein the second subset represents an unoccupied part of the depth map;
decoding the depth map,
wherein the decoding comprises converting each map value in the first subset to a corresponding depth value,
wherein at least one map value is not equal to the corresponding depth value; and
outputting the depth values.

8. The method of claim 7,
wherein at least one of the first subset and the second subset is defined by a first threshold level,
wherein the first threshold is one of the plurality of levels,
wherein one of the first subset and the second subset comprises all levels greater than the first threshold level.

9. The method of claim 7,
wherein the metadata comprises a definition of a piecewise linear function,
wherein the converting of the map values to depth values uses the piecewise linear function.

10. The method of claim 7, further comprising detecting any map values in the third subset of values before decoding the depth map,
wherein the metadata comprises a definition of a third subset of the plurality of levels,
wherein the third subset are guard levels.

11. The method of claim 7, further comprising
reconstructing at least one of a plurality of source views,
wherein the depth values are depth data of video data,
wherein the video data comprises the plurality of source views.

12. The method of claim 7, wherein the metadata comprises a negative normalized disparity value and a positive normalized disparity value.

13. An encoder comprising:
an input circuit,
wherein the input circuit is arranged to receive source data,
wherein the source data comprises depth values;
an analyzer circuit,
wherein the analyzer circuit is arranged to analyze the depth values,
wherein the analyzer circuit is arranged to define a depth map based on a result of the analysis,
wherein the depth map comprises an array of map values,
wherein each map value has one of a plurality of levels,
wherein the analyzer circuit is arranged to determine an encoding of the depth values into the map values,
wherein a range of the map values is not equal to a range of the depth values,
wherein the analyzer circuit is arranged to define a first subset comprising an occupied part of the depth map based on a result of the analysis,
wherein the analyzer circuit is arranged to define a second subset comprising an unoccupied part of the depth map based on the result of the analysis; and
a depth value encoder circuit,
wherein the analyzer circuit is arranged to assign one or more map values to the second subset of the depth map;
wherein the analyzer circuit is arranged to convert the depth values to map values in the first subset of the depth map; and
wherein the analyzer circuit is arranged generate a bitstream,
wherein the bitstream comprises the depth map and metadata,
wherein the metadata comprises a definition of the first subset and the second subset.

14. The encoder of claim 13,
wherein one of the subsets comprises all levels greater than a threshold level.

15. The encoder of claim 13,
wherein a third subset of the plurality of levels are guard levels,
wherein the metadata comprises a definition of the third subset.

16. The encoder of claim 13, wherein the analyzer circuit determines the range of the depth values.

17. A decoder comprising:
an input circuit,
wherein the input circuit is arranged to receive a bitstream,
wherein the bitstream comprises a depth map and metadata,
wherein the depth map comprises an array of map values,
wherein each map value is one of a plurality of levels,
wherein the metadata defines a first subset of an occupied part of the depth map,
wherein the metadata defines a second subset of an unoccupied part of the depth map;
a depth value decoder circuit,
wherein the depth value decoder circuit is arranged to decode the depth map,
wherein the decoding comprises converting each map value in the first subset to a corresponding depth value,
wherein at least one map value is not equal to the corresponding depth value; and
an output circuit,
wherein the output circuit is arranged to output the depth values.

18. The decoder of claim 17,
wherein one of the subsets comprises all levels greater than a threshold level.

19. The decoder of claim 17,
wherein a third subset of the plurality of levels are guard levels, wherein the metadata comprises a definition of the third subset.

20. The encoder of claim 17, wherein the analyzer circuit determines a dynamic range of the depth values.

* * * * *